Oct. 24, 1944.  W. J. MILLER  2,361,311
METHOD AND APPARATUS FOR MANUFACTURING POTTERY APPENDAGES
Filed Feb. 5, 1941  3 Sheets-Sheet 1
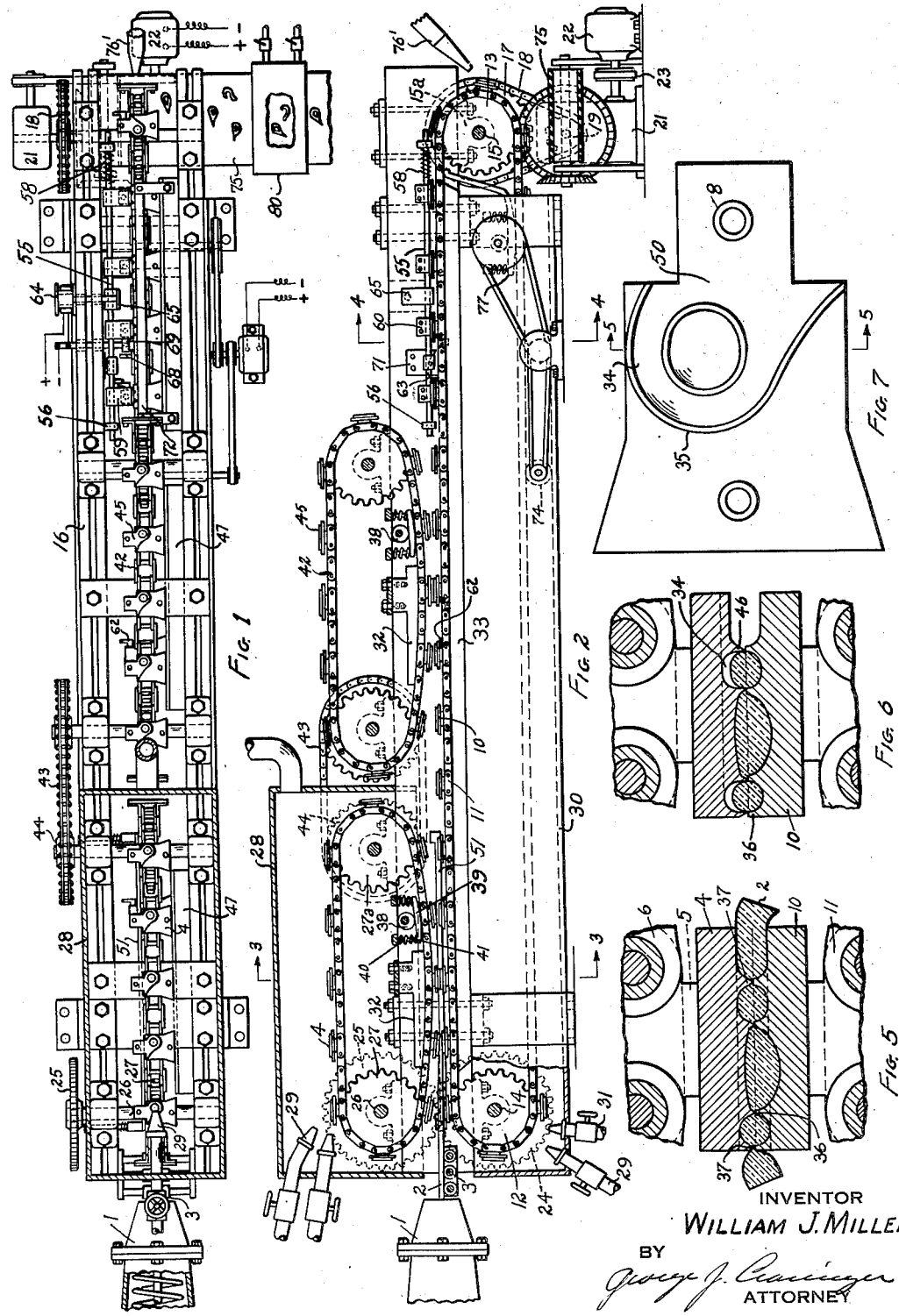
INVENTOR
WILLIAM J. MILLER
BY
ATTORNEY Oct. 24, 1944.   W. J. MILLER   2,361,311
METHOD AND APPARATUS FOR MANUFACTURING POTTERY APPENDAGES
Filed Feb. 5, 1941   3 Sheets-Sheet 2
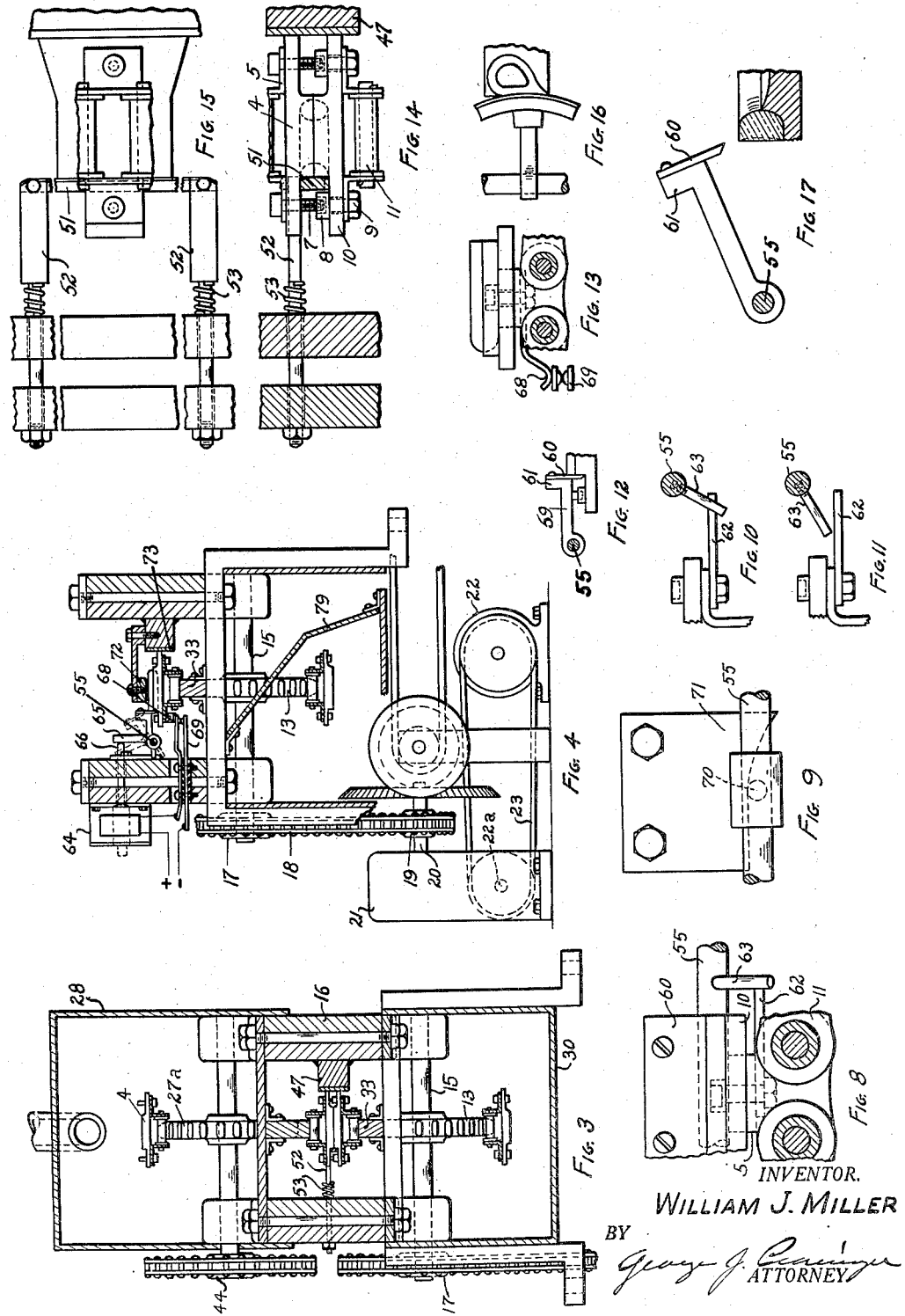
INVENTOR.
WILLIAM J. MILLER
BY
ATTORNEY Oct. 24, 1944. W. J. MILLER 2,361,311
METHOD AND APPARATUS FOR MANUFACTURING POTTERY APPENDAGES
Filed Feb. 5, 1941 3 Sheets-Sheet 3
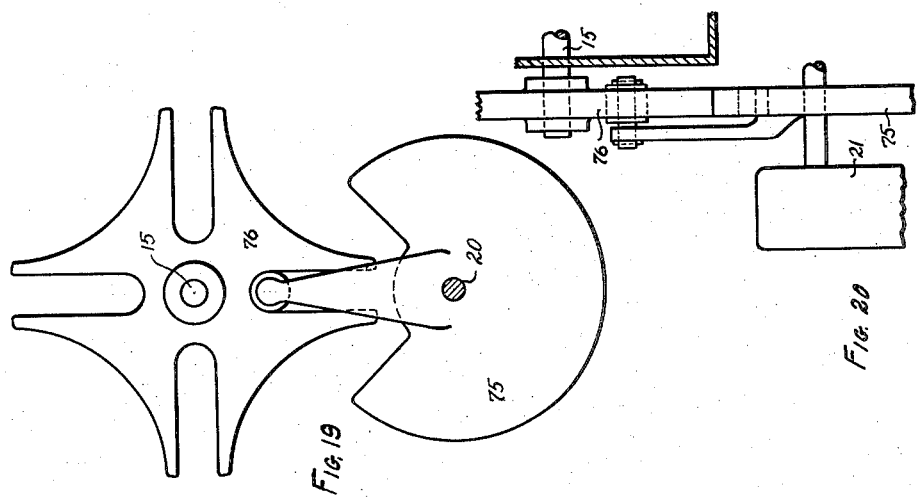
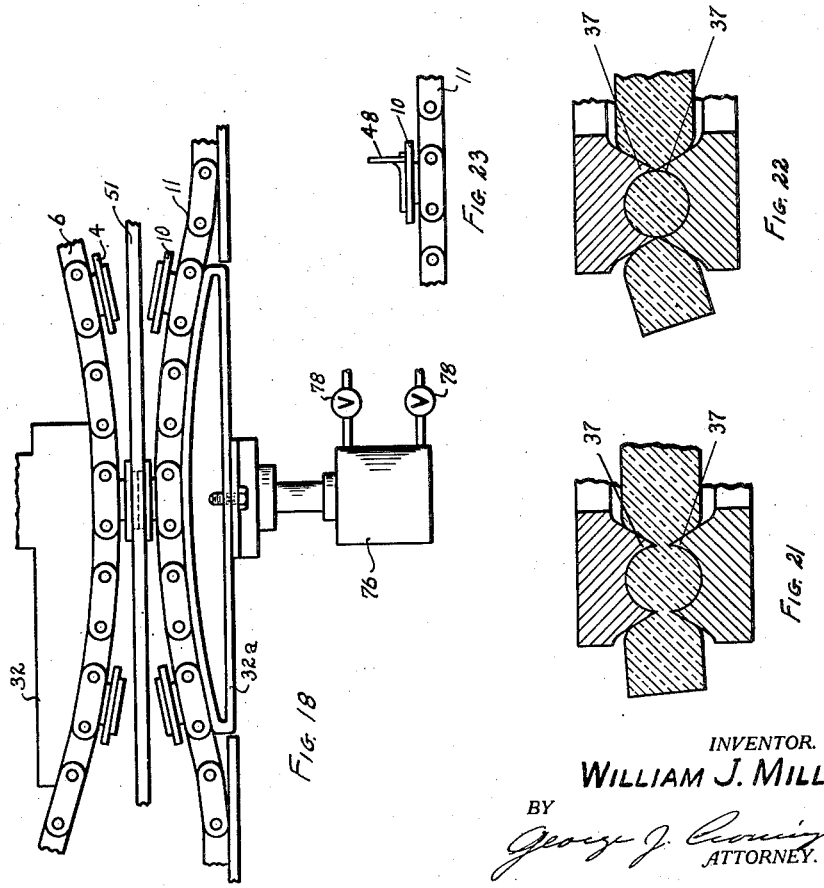
INVENTOR.
WILLIAM J. MILLER
BY
ATTORNEY.

Patented Oct. 24, 1944

2,361,311

UNITED STATES PATENT OFFICE 2,361,311

METHOD AND APPARATUS FOR MANUFACTURING POTTERY APPENDAGES

William J. Miller, Swissvale, Pa.

Application February 5, 1941, Serial No. 377,476

20 Claims. (Cl. 25—99)

This invention relates to methods and apparatus for manufacturing pottery appendages such as cup handles and the like from plastic ceramic materials.

It has to do with methods and apparatus for the mass production of appendages in one or more shapes from clay mass to completed article ready for attachment to preformed pottery ware. The improvements are particularly adapted for use in connection with mass-producing pottery ware-forming machinery; such as, that shown and described in my United States Patent 2,046,525.

In the drawings:

Fig. 1 is a top plan view of the preferred form of apparatus for manufacturing appendages.

Fig. 2 is a side elevation of the apparatus shown in Fig. 1.

Fig. 3 is a vertical sectional view taken on line 3—3 of Fig. 2.

Fig. 4 is a vertical section taken on line 4—4 of Fig. 2.

Fig. 5 is an enlarged vertical sectional view through a pair of cooperating appendage molds.

Fig. 6 is an enlarged vertical section through the device for trimming fins.

Fig. 7 is a top plan view of one of the appendage mold sections.

Fig. 8 is a detail showing a gang trimmer and certain of the operating parts therefor.

Fig. 9 is a detail of a cam arrangement for rotating the trimmer bar.

Figs. 10 and 11 illustrate two positions of operation of controls shown in Fig. 8.

Fig. 12 is a detail of one of the trimmers.

Fig. 13 is a detail of an electrical control.

Fig. 14 is a view partly in section showing in enlarged detail the cooperating mold sections and guide bars of Fig. 3.

Fig. 15 is a top plan view of apparatus shown in Fig. 14.

Fig. 16 is a detail showing how the appendage terminal portion is trimmed to fit the article vertically.

Fig. 17 is a detail showing how the terminal portion of the appendage is trimmed to fit the article circumferentially.

Fig. 18 is an elevation of a press which may be used at the forming position.

Fig. 19 is an elevation showing a Geneva drive for intermittently operating the machine.

Fig. 20 is an end view of the apparatus showing Fig. 19.

Fig. 21 is a detail in section illustrating a fragment of a partly closed forming mold provided with opposed cutting edges.

Fig. 22 is a view similar to Fig. 21 showing the mold fully closed.

Fig. 23 is a detail illustrating a mold cleaning device.

In Figs. 1 and 2, I designates a pugmill having an extrusion orifice capable of forming a ribbon of clay 2 which is received on rollers 3 and progressed by the force of extrusion between cooperable pairs of partible appendage forming molds. The upper mold sections 4 are attached to the apertured bent lug side plates 5 of endless roller chain 6 by bolts 7, Fig. 14. The ends of said bolts are unthreaded and serve as indexing pins for centering and aligning the mold sections when in cooperative relation. They project into the hollow heads 8 on bolts 9 holding the lower mold sections 10 on endless roller chain 11.

Roller chain 11 is mounted on sprockets 12 and 13 on shafts 14 and 15 respectively journaled in bearings 15a in frame 16 and has a substantially horizontal course running on track 33, Fig. 3. Shaft 15 is rotated by sprocket 17 and chain 18, Figs. 2 and 4, and sprocket 19 on power shaft 20 of variable speed transmission 21. Motor 22 is connected to the power shaft 22a of transmission 21 by belt 23. Gear 24 on shaft 14, Fig. 2, drives gear 25 on shaft 26 to thereby synchronically drive chain 6 on sprockets 27 and 27a with chain 11.

Upper chain 6 operates in a housing 28 having adjustable valved nozzles 29 preferably representing burners for heating the mold sections 4. Said mold sections are preferably operated at a temperature which will render same non-adhesive to the plastic ceramic material. If operated at a temperature sufficient to vaporize some of the liquid constituents of the plastic ceramic material, the steam thus generated will tend to repel the plastic material from the mold and will also tend to solidify or harden the outer surface. The lower chain 11 also operates in a housing 30 provided with nozzles 29 and 31 for the same purpose as explained in connection with housing 28. It will be understood that the nozzles 29 may be used for heating and/or spraying liquid such as oil or other substances onto the molding surfaces of the molds for various purposes including the release of the appendage or the conditioning of the mold for the reception of the appendage.

32 is an elongated thrust shoe adjustably secured to the frame 16, having a tapered chain engaging surface, Fig. 2, superimposed relative to the lower course of chain 6. The purpose of this device is to guide the mold sections 4 and 10 into firm closing engagement.

In Fig. 2, the upper course of the chain 11 is shown as substantially tangent to the arc of travel of the lower course of chain 6 as the molds approach and leave the forming position. If desired, the lower chain 11 may, instead of traversing a straight line, follow an arcuate path externally tangent to the arcuate path of the upper chain course and this is illustrated in Fig. 18 wherein the lower chain 11 rides over the arcuate surface of a shoe 32a opposed to the upper thrust shoe 32.

With reference to Figs. 5 and 7, each mold section comprises an apertured body portion having an appendage forming cavity 34 with marginal ridges 35 defining the cavity, the lower mold section preferably having flat upper surfaces 36, see Fig. 5, and the upper mold section having knife edges 37, or both upper and lower molds may have knife edges as shown in Figs. 21 and 22. The purpose of the knife edges is to cut the ceramic material away on either side of the appendage as the mold sections close, thereby reducing to as great extent as possible the production of fins and eliminating additional trimming in this respect. However, I do not limit myself to forming and trimming the appendage in one operation since with certain clays that do not mold or cut easily it may be more practical to form at one position and trim at another.

Cam 38 vibrates bar 39 engaging the lower course of chain 6 to insure release of the appendage to the lower mold section. The bar is suspended from the frame 16 by tension springs 41 and held in alignment by guide rods 40.

The mold sections when in cooperative relation normally would have an open side representing the zone of the terminal or attaching face of the appendage, see zone 50, Fig. 7. In order to cap this normally open side of the mold during the molding operation, a closure 51 in the form of an elongated bar, Figs. 2, 15 and 14 is provided. Said bar is horizontally disposed between the opposed courses of upper and lower chains 6 and 11. The mold sections close on said bar as shown in Figs. 15 and 18 with the side surface of the bar intimately engaging the mold sections and closing the gap. The closure bar 51 is supported from the frame 16 by means of laterally extending horizontally adjustable thrust rods 52 having thrust springs 53 thereon. As illustrated in Fig. 18, the thrust rod is tangent to the arc of travel of the lower course of chain 6 and parallel with the upper course of chain 11. As the mold sections come together, they tend to close upon the bar and "ride" the same. The material isolated in the molding cavity is normally prevented from escaping however it is desired that excess clay be permitted to extrude under pre-determined back pressure and such pressure will be determined by the resistance afforded by springs 53. The bar also tends to compact the terminal portions or portion of the appendage during the molding. The length of said bar is preferably only sufficient to engage the material whilst the gap is being closed and during the critical molding period. 47 is an horizontal guide and thrust rail for counteracting the thrust of bar 51.

After the appendage has been formed and released to the lower mold sections 10, said appendage is transported therein to means for removing excess clay such as fins and the like normally occurring along the line of juncture of the mold. This operation I shall designate as "fettling" and the means a "fettler." Said device comprises an endless chain 42 driven by chain 43 and sprocket 44 synchronically with chain 6. Fettling devices 45 are attached to chain 42 in evenly spaced relation on centers corresponding to center to center spacing between molds 10. Said fettling devices 45 are of substantially the same construction as the mold sections 4 except that the cavity 34 is deeper to avoid contact with the appendage and thereby minimize possible adhesion or the application of pressure to the appendage. Knife edges 46, Fig. 6, cleanly cut away any remaining fins on the appendage. Otherwise, the chain 42 and mechanism associated therewith is substantially the same as chain 6, there being a thrust shoe 32 and a vibrator cam 38 for purposes previously described.

The fettling tools 45 may be heated if desired or treated in various ways to render the same non-adhesive. It will be noted that the bar 51 is eliminated because there is no extruding pressure applied to the appendage during this operation and therefore no need to restrict the ceramic material.

One or more scrapers 48, Fig. 23, may be mounted at selected points on the frame 16 in position to scrape scrap clay from the top surface of the lower molds 10, preferably immediately after molding and fettling.

After the appendages have been fettled, they are transported in mold sections 10, Figs. 1 and 2, to a trimming device for cutting the attaching surface of the terminal or terminals of each appendage to proper contour to fit the surface of the ware to which the appendage is to be attached. Said trimmer preferably comprises a group of blade holders having the same or different blades attached thereto located in spaced relation on shaft 55.

Since the present apparatus may produce appendages of the same or different shape and design, this invention comprehends the manufacture of appendages of different designs in consecutive order or in groups of any desired number. Therefore, the trimmers will be arranged to correspond with the requirements of the appendage upon which each individual trimmer is to operate. Thus, the trimmers may be all alike or they may have different trimming and cutting characteristics.

Said trimmer includes a slidable and rotatable shaft 55 supported in bearings 56 attached to frame 16 at one side of the upper horizontal course of chain 10. Mounted in spaced relation along shaft 55 are several blade holders 59, the spacing being equal to the center to center spacing of the mold sections 10. Each blade holder has a trimming blade 60 detachably fastened to the head 61.

The axis of shaft 55 is parallel to the line of joinder of the mold sections 4 and 10. The holders 59 project laterally relatively to the chain 10 and are fastened securely to the shaft 55 for rotational and sliding movement therewith. In idle position, said holders and blades are raised as shown in Fig. 17, in order not to interfere with the molds which move into the trimming zone therebelow.

Fastened to chain 11 at spaced intervals are dogs 62, Fig. 8 adapted to engage an arm 63 secured to shaft 55 normally projecting into the path of travel of the dogs 62 when the shaft is in full retracted position, Fig. 2. A compression and torsion spring 58a, Fig. 1, normally urges the shaft to the left. After a predetermined number of mold sections 10 carrying fettled appendages have entered the trimming zone, a dog 62 engages the arm 63 thereby propelling the shaft 55 to the right at the same speed of travel as the chain.

In the lengthwise center of shaft 55, Fig. 1, is secured a vertical thrust plate 65 positioned so as to be engaged by a thrust rod 66 secured to the core of a stationary solenoid 64 fastened to frame 16. As shaft 55 is shifted to the right, a cam 68, Fig. 13, closes switch 69 thereby energizing a solenoid 64 and causing thrust rod 66 to rotate shaft 55. This action depresses the gang of trimmers thereby trimming the attaching face of the appendage terminal or terminals on a radius as shown in Fig. 17.

The cutting edge of the blades transcribes an arc having a radius substantially equal to the distance between the axis of the article to which the appendage is to be attached and the outside circumference of the body. Thus, the terminals of the appendage are cut exactly to shape to match the circumference of the article. It might be mentioned in passing that the diameters of commercial articles is more or less standardized and it would therefore be most practical in operating the present apparatus to standardize to as great an extent as possible on the production selected for any particular run.

During the aforesaid operations, the shaft 55 is in continuous longitudinal sliding motion, and switch 69 remains closed only for a short interval. When switch 69 is opened, shaft 55 is rotated to thereby raise the trimmers by a cam 71 which turns pin 70, Fig. 9, thereby rotating shaft 55 in a clockwise direction. This action raises pin 63, see Figs. 10 and 11 out of engagement with dog 62 thereby permitting spring 58 to snap shaft 55 to the left to original position. Spring 58 is designed to provide sufficient torsion to rotate shaft 55 in a counter-clockwise direction once the arm 63 has cleared the dog 62 to return the arm 63 to a position where it may be engaged by the next dog 62 in succession.

An overhead bar 72 extending the length of the trimming zone and positioned close to the upper surface of the appendage and close to the knife or blade is provided to prevent lifting of the appendage in case the blade adheres to and tends to pull the appendage out of the molding cavity on the upstroke. In order to accurately position the molds during the trimming, I provide a bar 73 supported by the frame 16 which engages one side of the mold, preferably the side opposite the trimming members. Said bar is located on the longitudinal center line of the molds which tend to "ride" the same during the trimming operation.

In some instances, it may be desired to operate the apparatus intermittently and in Figs. 19 and 20 I have shown a Geneva drive which may be substituted for the chain drive 18. Said drive consists of a motion plate 76 which replaces sprocket 17 and a Geneva cam 75 which replaces sprocket 19 on shaft 20.

It may also be desired to raise and lower the molds 10 at the forming position and in this connection as shown in Fig. 18 an arrangement consisting of a hydraulic cylinder 76 attached to and capable of raising and lowering a thrust shoe 32a having an arcuate surface over which the chain 10 passes at the forming position. Thus the molds as they approach closing relationship may be firmly pressed together at the molding position where the said mold sections are coaxial. With an arrangement of this character, it is preferred to use the intermittent Geneva drive. Thus the mold sections would be brought on center and then closed by vertical motion of the lower mold section. The vertical movement of the mold would be slight and would not exceed the normal slack of the chain. The motion could be controlled by valves 78 actuated by a timer driven off the Geneva or by any other suitable means. By pressing the mold sections together, a certain amount of strain would be removed from the chain and the closing action of the molds would probably be more positive, however, this is not meant as an adverse reflection upon the operating efficiency of a system wherein the mold travels continuously.

Fig. 16 shows one of the many shapes the trimmer may take. In this instance, the trimmer is of arcuate form in order to show the lengthwise curvature of the attaching portion of the appendage. The terminals of the handle must not only be fit circumferentially to the surface of the article for which they are made, but they must fit any heightwise curvature as, for example, a straight walled coffee or bell mouthed teacup. Therefore, there may be many variations in the exact shape and contour of the terminals and their relative positions, however, it is within the scope of this invention to provide a trimmer and to operate the trimmer in such fashion as to produce the desired contour and radius on the attaching surface or surfaces of the appendage. It will be understood that I am not limited to the exact shape or design of trimmer disclosed or to the motion of the trimmer bar described and illustrated.

After the appendages have been molded, fettled and trimmed as aforesaid, the mold sections 10 are inverted over a conveyor belt 75 as the chain 11 passes over sprocket 13. The appendages are preferably removed by gravity but in case the appendage sticks, then air jets 76 may be employed to help dislodge the appendage or the mold may be vibrated by motor-driven vibrators 77. After the mold is emptied, it passes into the housing 30 where it may be further vibrated to thoroughly clean the same and, if desired, said molds may be passed over brushes 74, air jets and the like to thoroughly clean the same. The scrap may fall into a chute 79 or onto a belt conveyor (not shown), Fig. 4 for carrying scrap to the outside.

It is preferred to condition the appendages before they are attached to the article of ware and to do any other such operations as sponging after appendage has been removed from the mold. If desired, the belt conveyor may travel directly into a conditioning chamber 80 equipped with air-conditioning means whereby the appendage may be brought to a physical condition compatible to that of the ware. The length of this chamber and the length of time the appendage is exposed to a conditioning atmosphere will depend upon the character of the clay from which the appendage is being made and the amount of conditioning required. After the appendage has been matured it is attached to the article for which it is made and this is accomplished by dipping the terminal portion of the appendage in slip and sticking it mechanically or manually to the article.

It is within the scope of this invention to:

(a) Mold a complete appendage (except for trimming the terminal portion), in one and the same operation as by cooperation of mold sections 4 and 10 thereby comprehending the elimination of the "fettler." In such event the mating cavities of the molds 4 and 10 could be considered as the molding means and the cutting edges of one or the other or both mold sections (see Figs. 5, 21 and 22) would either accomplish the work of the fettling or fin trimming means or eliminate the work thereof depending on the point of view. At least, the cutting edges of either one or the other or both mold sections (see Figure 21 for the latter) could be depended upon to cut the material cleanly along the juncture lines of the molding cavity thereby leaving no fins to be later trimmed away. Resiliently supported bar 51 provides an escape for clay if the pressure within the molding cavity resulting from tightly closing the mold becomes excessive;

(b) Mold and trim the appendage in two or more operations thereby comprehending the use of the "fettler." In some instances the consistency of the clay may make it impractical to mold and trim in one and the same operation. Therefore, the initial molding of the appendage may be accompanied by partial trimming only and the fettler may complete the operation. However, as a general precautionary measure, just to insure that all fins are removed it is preferred to run the appendages through the fettler whether molded and finally trimmed co-incident with forming or not;

(c) Mold, trim and cut the attaching portions of the terminals to shape in sequential operations following immediately one upon the other. The use of heat in connection with primary molding will assist in stabilizing the body of the appendage due to the withdrawal of moisture and the hardening at least of the surface of the appendage. Thus, as distinguished from conventional practice, there is no need to store the appendage for an interval until the material hardens sufficiently to take a cut without deformation;

(d) Mold, trim, cut the terminals to shape and mature (the latter term meaning to produce in the appendage a physical state of dehydration and hardness suitable for attaching the same to a previously formed article of ware) the appendage in a series of operations immediately following one upon the other without the time lag experienced in manual production thereby providing for rapid production between clay mass and finished product within a much shortened interval;

(e) Mold, trim, cut the terminals to shape and mature a diversified production.

Where it is desired to maintain the mold sections 4 and 11 in closed relation for a longer period of time, the lower course of chain 6 and the upper course of chain 11 may run in parallelism for any desired distance. If the machine is utilized in molding hot plastics, this increased interval of cooperation may be desired in order to permit the material to set.

Having thus described my invention, what I claim is:

1. Apparatus for manufacturing potteryware appendages having one or more travelling appendage molding means and mechanically actuated means arranged to travel with the molding means for detaching excess material from the body of the appendage whilst the appendage is disposed in the molding means.

2. Apparatus for manufacturing potteryware appendages having one or more travelling molding means, and means arranged to travel with the molding means for detaching excess material from the body of the appendage whilst the appendage is disposed in the molding means.

3. Apparatus for manufacturing potteryware appendages having a plurality of traveling appendage molding means, means for feeding a ribbon of ceramic material to said molding means whilst said molding means are in motion and means movable therewith for detaching excess material from the body of the appendage whilst the appendage is disposed in the molding means.

4. Apparatus for manufacturinng pottery appendages having one or more appendage molding means, means cooperable with the molding means for fettling the appendage and trimming the terminal or terminals of the appendage to proper shape.

5. Apparatus for manufacturing potteryware appendages comprising, in combination, one or more pairs of travelling cooperable mold sections, means for fettling appendages arranged to travel with the appendage and means for shaping the terminal portion or portions of the appendage also arranged to travel with the appendage.

6. Apparatus for manufacturing potteryware appendages comprising, in combination, one or more travelling appendage molding means, means for feeding clay thereto, means for fettling the edge of the appendage arranged to travel with the molding means, and means intermittently movable with the molding means for trimming the terminal portion of the appendage.

7. Apparatus for manufacturing potteryware appendages comprising, in combination, one or more travelling appendage molds composed of separable sections, means for feeding clay thereto, means arranged to travel with the appendage after the same has been molded for trimming excess material therefrom, means for conveying trimmed appendages to an attaching position there being means associated with said last named conveyor for maturing appendages.

8. Apparatus for manufacturing potteryware. appendages comprising a pair of spaced endless conveyors having opposed courses, mating appendage mold sections attached to said conveyors, extrusion mechanism for feeding a ribbon of clay between said mold sections, means for driving said conveyors to move said mold sections successively into cooperative relation, and means operable to trim said appendages whilst being transported by one of said conveyors subsequent to molding.

9. Apparatus for manufacturing potteryware appendages comprising, in combination, a pair of spaced endless conveyors, appendage molding means attached to each of said conveyors and adapted to cooperate to form an endless succession of appendage molds. means for driving said conveyors in synchronism, an extrusion apparatus for feeding clay to said molds, means for rendering said molds substantially non-adhesive to clay and cutting means for trimming the terminal portions of the appendages arranged to travel therewith subsequent to fabrication of the appendages.

10. Apparatus for manufacturing potteryware appendages comprising, in combination, a pair of spaced endless conveyors having opposed courses, appendage molding means attached to said conveyors and adapted to cooperate to form one or more appendage molds and a third conveyor having fettling means attached thereto for cooperation with said molding means to fettle the appendages.

11. Apparatus for manufacturing potteryware appendages comprising, in combination, a pair of spaced conveyors, means for moving said conveyors in synchronous fashion, mold sections attached to said conveyors and adapted to cooperate with each other, means for feeding clay thereto and means shiftable in the direction of travel of one of said conveyors and oscillatable relative thereto for trimming appendages.

12. The method of manufacturing pottery appendages which comprises, molding the appendage, and fettling and trimming the terminal portion thereof before the appendage is entirely removed from the mold.

13. In combination, movable appendage molding and traveling appendage fettling means, and mechanism for operating both in synchronous fashion for the uninterrupted production, in successive order, of formed, fettled appendages.

14. In combination, movable appendage molding and mechanically actuated terminal trimming means, and mechanism for operating both in synchronous fashion for the uninterrupted production, in successive order, of formed, trimmed appendages.

15. In combination, movable appendage forming, appendage fettling and terminal trimming means, and mechanism for operating all of said means in synchronized fashion for the uninterrupted production, in successive order, of formed, fettled and trimmed appendages.

16. In combination with a clay feeder, appendage forming means, appendage fettling means, terminal trimming means, and mechanism for operating all of said means in synchronized fashion for the uninterrupted production, in successive order, of formed, fettled and trimmed appendages from the clay supplied by the feeder.

17. In combination, apparatus for advancing a line of appendage mold sections to appendage molding and trimming zones, means traveling therewith and movable relative thereto for molding and trimming appendages therein and means for operating said molding and trimming means in synchronous fashion with relation to the apparatus for the uninterrupted production, in succession, of formed, trimmed appendages.

18. In an appendage forming machine, a plurality of separable appendage molds having appendage forming cavities with one or more outlets defining the terminal portion of the appendage, means for advancing the molds along a path wherein appendages are molded therein and means for closing the outlets whilst appendages are being molded therein.

19. In an appendage forming machine, a plurality of separable appendage molds having appendage forming cavities with one or more outlets defining the terminal portion of the appendage, means for advancing the molds along a path wherein appendages are molded therein, means arranged alongside the path of travel of the molds for closing the outlets and preventing the substantial escape of molding material therethrough and means whereby the closing pressure may be varied.

20. In combination with a clay feeder, automatically operable appendage molding means, automatically operable appendage trimming means including a cutting implement and means for moving the cutting implement with the molding means and mechanism for operating both of said means in synchronized fashion for the production, in successive order of molded and trimmed appendages from the clay supplied by the feeder.

WILLIAM J. MILLER.